United States Patent [19]
Baum

[11] Patent Number: 6,036,909
[45] Date of Patent: Mar. 14, 2000

[54] METHOD FOR EMBOSSING WEB MATERIAL USING AN EXTENDED NIP

[75] Inventor: Scott Baum, Fremont, Wis.

[73] Assignee: Kimberly-Clark Worldwide, Inc., Neenah, Wis.

[21] Appl. No.: 08/978,301

[22] Filed: Nov. 25, 1997

[51] Int. Cl.[7] .......................... B29C 59/04; B29C 59/02; D21F 3/00
[52] U.S. Cl. ...................... 264/280; 264/284; 162/358.3; 162/358.4; 425/373
[58] Field of Search ..................... 264/284, 280; 162/358.3, 358.4; 425/363, 373

[56] References Cited

U.S. PATENT DOCUMENTS

| 3,323,983 | 6/1967 | Palmer et al. | 162/362 |
| 4,211,743 | 7/1980 | Nauta et al. | 264/284 |
| 4,330,023 | 5/1982 | Cronin . | |
| 4,425,190 | 1/1984 | Cronin . | |
| 4,440,597 | 4/1984 | Wells et al. | 162/111 |
| 4,975,152 | 12/1990 | Filzen et al. . | |
| 5,048,589 | 9/1991 | Cook et al. | 162/109 |
| 5,098,523 | 3/1992 | Iimarinen et al. . | |
| 5,131,324 | 7/1992 | Lassila et al. . | |
| 5,137,678 | 8/1992 | Hess et al. | 264/280 |
| 5,163,364 | 11/1992 | Bubik et al. . | |
| 5,251,551 | 10/1993 | Abe et al. . | |
| 5,262,011 | 11/1993 | Iimarinen . | |
| 5,356,364 | 10/1994 | Veith et al. | 493/395 |
| 5,356,506 | 10/1994 | McNeil et al. . | |
| 5,423,949 | 6/1995 | Iimarinen . | |
| 5,483,873 | 1/1996 | Koivukunnas et al. . | |
| 5,543,015 | 8/1996 | Jermo | 162/358.4 |
| 5,562,805 | 10/1996 | Kamps et al. . | |
| 5,582,689 | 12/1996 | Van Haag et al. . | |
| 5,607,551 | 3/1997 | Farrington, Jr. et al. | 162/109 |
| 5,795,440 | 8/1998 | Ampulski et al. | 162/117 |
| 5,833,810 | 11/1998 | Laapotti | 162/360.3 |
| 5,836,242 | 11/1998 | Aberg | 100/327 |
| 5,843,283 | 12/1998 | Henssler et al. | 162/358.3 |

FOREIGN PATENT DOCUMENTS

| 566036 | 11/1958 | Canada | 425/373 |
| 3800513 | 7/1989 | Germany | 425/373 |

Primary Examiner—Jan H. Silbaugh
Assistant Examiner—Michael I. Poe
Attorney, Agent, or Firm—Gregory E. Croft

[57] ABSTRACT

Cellulosic webs can be embossed using an extended nip structure with embossing means in a controlled nip dwell zone. Single and multiply wipes and towels produced by plying together two or more such webs can be embossed. Webs having common caliper and basis weight can be processed using the extended nip structure with an appropriate embossing means. The tendency of the embossed relief to relax and disappear after processing can be substantially alleviated by controlling dwell time to ensure reliable embossing.

11 Claims, 5 Drawing Sheets

FIG. 6

METHOD FOR EMBOSSING WEB MATERIAL USING AN EXTENDED NIP

TECHNICAL FIELD

This invention generally relates to an apparatus and method of embossing a web of material, and more particularly to embossing a web of material using an extended nip. More particularly, the invention relates to embossing cellulosic base sheets using an extended nip with an embossing means in the nip zone.

BACKGROUND

Paper products generally in the form of a cellulosic web, such as hand towels, wipers, and the like are manufactured widely in the paper making industry. Each product has unique product characteristics requiring the appropriate blend of product attributes to ensure that a product can be used in its intended use locus. These attributes include tensile strength, water absorbency, caliper, and stretch. Typically, many paper products are made using a through-drying process. Throughdrying is a common means of drying paper webs using a relatively non-compressive method of removing water from the web by passing hot air through the web until it is dry. More specifically, a wet lade web is transferred from a forming fabric to a coarse, highly permeable throughdrying fabric and retained on the through-drying fabric until drying is complete. The resulting dried web is softer and bulkier than webs dried by other methods because fewer bonds are formed and because the web is substantially uncompressed. The throughdried product is somewhat stiff and rough to the touch. The throughdried sheet is often directed to other processing steps to convert the material base sheet into value added products by combining base sheets, coating base sheets, or further converting the base sheets into improved materials.

Before discussing the invention, other aspects of the paper industry should be discussed. Extended nip presses have been adapted to paper making processes over the last few years. Typically, extended nip presses are used on board and other non-tissue paper grades. These extended nip presses are used to apply higher loads to sheets for the purpose of calendering dried sheets or dewatering wet lade sheets.

More particularly, extended nip presses are used in the paper industry to press water from a formed web. These systems involve passing a wet paper web between a backing roll and a felt where the felt is supported on one side by an endless belt. A press shoe presses the belt towards the backing roll causing the felt to partially wrap around the arc of the backing roll. The paper web is dewatered as it passes through the extended nip. Extended nip rolls have also been used in soft calendering. See for example, U.S. Pat. No. 5,163,364 to Bubik et al. Surface properties of paper and board passing through a calender nip can be improved. The "supersoft" calender incorporates a relatively soft elastic moving belt supported by a glide or a roll instead of the covered roll in a conventional soft calendar. As a result, smoothness and variation in gloss can be substantially improved using supersoft calender processes in an extended nip. Prior art embossing processes typically involve contacting the cellulosic sheet with common embossing structures involving opposed rolls having matched male and female embossing means.

Typically, a pair of contacting rolls are used to convert a cellulosic web. Traditional embossing methods include a matched pair of steel embossing rolls, arranged to move relative to each other to form a conventional non-extended roll nip. The web is embossed as it passes through the nip. Another method of embossing tissue utilizes oppositely disposed steel and rubber rolls are used to emboss the web. Such embossing is used to increase the bulk and to impart a pattern on the tissue web. In other applications, rolls are used to perforate a web. See for example, U.S. Pat. No. 5,356,506 to McNeil et al., which discloses a patterned roll for converting a paper laminate. The roll has a hollow cylindrical perforate outer shell with a plurality of radially oriented holes through the shell.

At relatively low operational speeds, traditional systems are sufficient to produce a defined and stable embossing pattern. However, with increasing web speeds the embossing pattern is difficult to maintain. Conventional embossing improvements have centered on the configuration of the embossing roll. For example, the embossing pattern has been altered to produce a higher bulk and softer embossed sheet. See U.S. Pat. No. 5,562,805 to Kamps et al., where fine-scale intermeshed embossing elements of two rolls emboss the tissue thereby increasing tissue surface fuzziness which can improve softness.

Other attempts to improve the embossing pattern have involved changing the roll material from traditional steel to a softer material. See U.S. Pat. No. 4,211,743 to Nauta et al., where the embossing rolls have a resilient surface of varying hardness. The resilient surfaces temporarily deform within the nip thereby ensuring that the web material is fully contacted by the embossing pattern. Generally, a heated thermoplastic web is passed between this resilient roll nip. Heating the web makes the web more moldable. However, heating the web is often not preferable or even possible, particularly when the web is cellulosic. Traditional roll-on-roll embossing methods of cellulosic webs continue to have many shortcomings. Throughdried cellulosic webs present additional problems because their resilient tissue structure and high internal bulk inhibit pattern retention. For example, a soft throughdried tissue web as disclosed in U.S. Pat. No. 5,607,551 to Farrington et al. possesses such resilient characteristics. Such webs tends to relax to some degree to its original state when released from the embossing nip.

Another disadvantage associated with traditional roll-on-roll embossing methods is that an operator has limited control over the embossing pattern once a machine is set up. Variables affecting the pattern are relatively fixed. For example, the rolls are in contact for a finite amount of time, so the embossing dwell time is limited. Dwell time is the amount of time that the web material is in contact with the embossing elements. Dwell time is a function of web speed and nip width. Nip width is controlled by roll diameter, nip load, and the roll surface characteristics. Larger rolls, higher loads, and softer roll surfaces will produce a wider nip and result in a longer dwell time. Decreasing web speed and increasing nip width are not realistic alternatives where the trends in the industry are faster web speeds, replaceable components, and shorter machine set-up times. In addition, high nip loads on softer roll surfaces at high web speeds creates heat which adversely affects the embossing process and creates safety concerns.

Therefore, a need exists for an embossing method and apparatus that will produce a retained embossing pattern in a resilient cellulosic web traveling at high web speeds. Moreover, a need exists for the greater control of the embossing process to accommodate different web materials and speeds.

SUMMARY

The present invention provides a method and apparatus for embossing a cellulosic web using an extended nip with a defined dwell time in the nip zone. The extended nip is adjusted to provide a sufficient dwell time defined as an angle of arc and more control over the embossing process resulting in an embossed web that retains its pattern despite increased web speed and web resiliency.

In the nip structure, a rotatable roll has a male embossing pattern. A continuous flexible belt faces the roll. The belt is proximate from the roll and is pressure activated by a concave press shoe. In operation, the press shoe presses the belt against the roll causing the belt to partially wrap around an arc of the roll thereby creating an extended nip press. A web of material is passed through the extended nip at the same speed as the surface of the roll and belt. The roll and belt impress an embossing pattern upon the web of material. The web of material is then removed from the extended nip.

DETAILED DESCRIPTION

The invention resides in an embossed cellulosic web product, including paper and tissue, that can be used to form a wipe or towel structure. The web can be layered or nonlayered, creped or uncreped, wet pressed or throughdried, preheated, premoistened, and can be single-ply or two-ply or multiply ply. The basis weight of the tissue sheet can be about 10 to 30 grams per square meter per ply. Suitable cellulosic fibers for use in conjunction with the invention include secondary (recycled) paper making fibers and virgin paper making fibers that can be combined in any effective proportion. Such fibers include, without limitation, hard wood and soft wood fibers as well as non-wood derived fibers. Non-cellulosic synthetic fibers can also be included as a portion of the finish. A high quality product having a unique balance of properties can be made using predominantly secondary fibers or all secondary fibers. The finished basis weight of the individual sheets or plies of tissue used for the purpose of the invention can preferably be from about 10 to about 30 grams per square meter per ply. Either before or after embossing, the sheets can be plied together to form multiplied products having two, three, four or more plies. Wet strength resins can be added to the finish as desired to increase the wet strength of the final product. Presently, the most common used wet strength resins belong to the class of polymers termed polyamide-polyamine epichlorohydrin resins. There are many commercial suppliers of these types of resins including Hercules (Kymene®, Henkel Corp.), Fibrabon® (Borden Chemical), Cascamide® (Georgia Pacific Corp.) and others. These polymers are characterized by having a polyamide backbone containing reactive crosslinking groups distributed along the backbone. Other agents that have been found useful in the present invention of the wet strength agents based on formaldehyde crosslinking of polymeric resins such as urea-formaldehyde and melamine formaldehyde-type wet strength resins. A third class of wet strength resins are the aldehyde derivatives of polyamide resins exemplified by American Cyanamide products known as Parez® as well as materials described in U.S. Pat. Nos. 5,085,736, 5,088,344 and 4,981,557 issued to Proctor & Gamble Co. The exact amount of material depends on the specific type of resin, fiber type and forming apparatus used. Suitable formation of the wet lade sheet include processes such as Fourdrinier and other conventional forming processes well known in paper making. Twin wire formers are particularly well suited for the relatively low basis weights associated with base sheets in towels and wipes of the invention. Forming wires on fabrics can also be conventional. The finer weaves with greater fibers support are preferred to produce a more smooth sheet or web. Preferably the web is made in a drying process including a non-compressive drying step which tends to increase the caliper thickness of the web including without limitation, throughdrying, infrared radiation drying, microwave drying, etc. Because of its substantial commercial availability and practicality, throughdrying is a well known and preferred means for non-compressively drying the web. Suitable throughdrying processes are described in U.S. Pat. No. 5,048,589, U.S. Pat. No. 4,440,597 and others which are herein incorporated by reference.

Ply attachments to form the products of the invention can be performed by any ply attachment means as is well known in the paper industry. Crimping is a preferred attachment means. The smooth side of the ply is the side not in contact with the throughdrying fabric during drying, often referred to as the "air side" of the sheet. The opposite side is generally referred to as the "drier side". Products of the invention have a machine direction tensile strength of about 300 to 12,000 grams per 3 inches of width. The dry caliper of the individual uncalendered base sheets are plies of the products of the invention is about 0.4 millimeters per ply or greater, preferably about 0.6 millimeters per ply or greater and suitably from about 0.4 to about 0.8 millimeters. Dry caliper is the thickness of a dry product or ply measured under a controlled load pressure. One method for determining dry caliper utilizes a Starrett Diode Gauge (Model 2320 available from Mitutoyo Corporation, Landic Mita Building, 31-19 Shiba, 5-Chome, Minato-ku, Tokyo, 108 Japan).

A preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

In general, the present invention relates to an apparatus and method of embossing a cellulosic web of material, and more particularly to embossing a web of cellulosic material using an extended nip with a defined dwell time. Depending on the embodiment that is used, the invention allows for an effective dwell time to obtain quality embossing, more control over the embossing process, and a final embossed web that retains its embossing pattern despite increased web speed and increased web resiliency.

The present invention has many advantages. One advantage is that it increases pattern retention in an embossed web, particularly where the web is resilient. The increased dwell time provided by the extended nip allows for faster web speeds. The present invention provides other advantages as well. For example, the extended nip allows for more control over the embossing pattern and process. The nip width can be set independently of the nip load thereby improving process flexibility.

Figure 1:
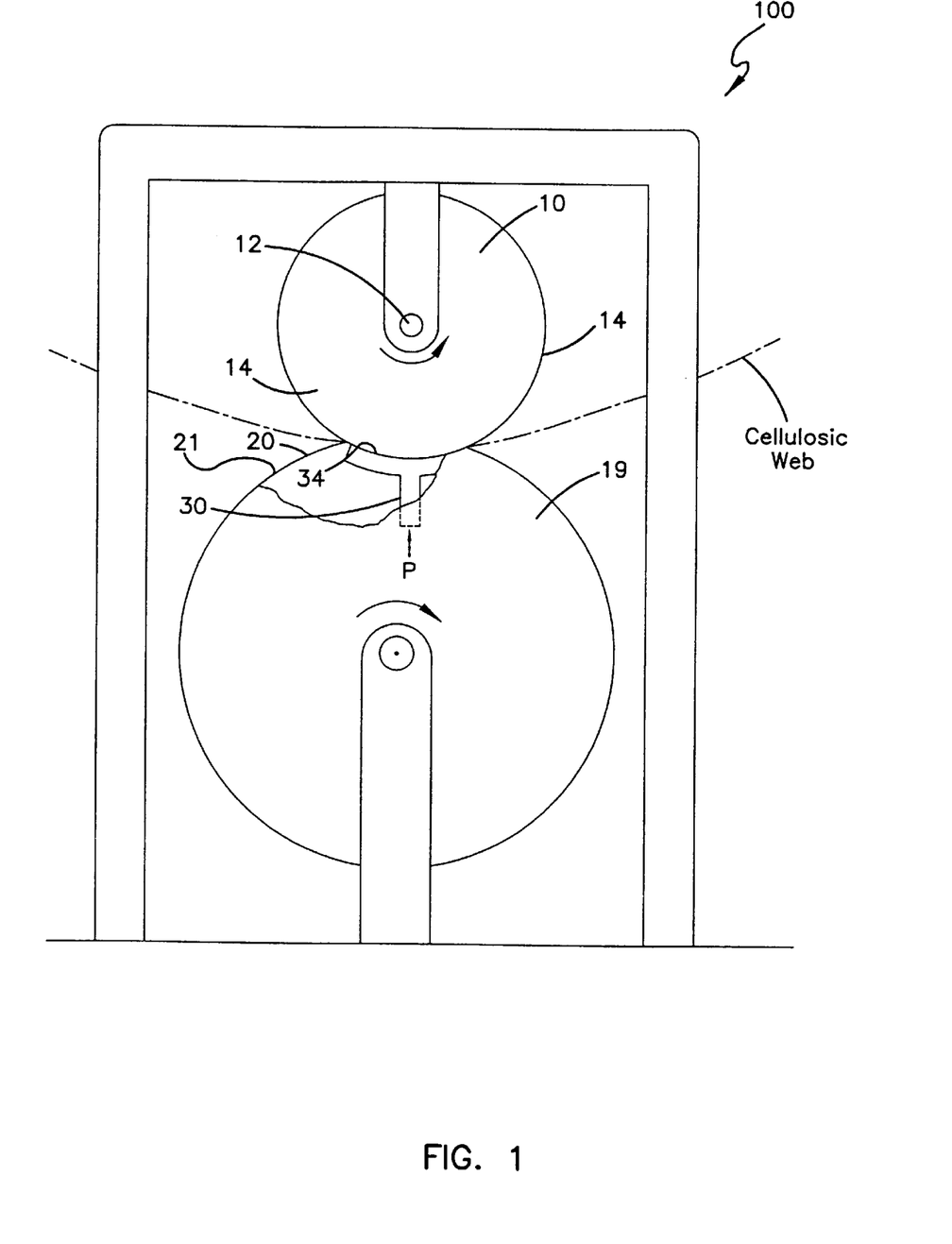
FIG. 1 is a schematic front view of a first embodiment of the extended nip embosser of the present invention.
Figure 2:
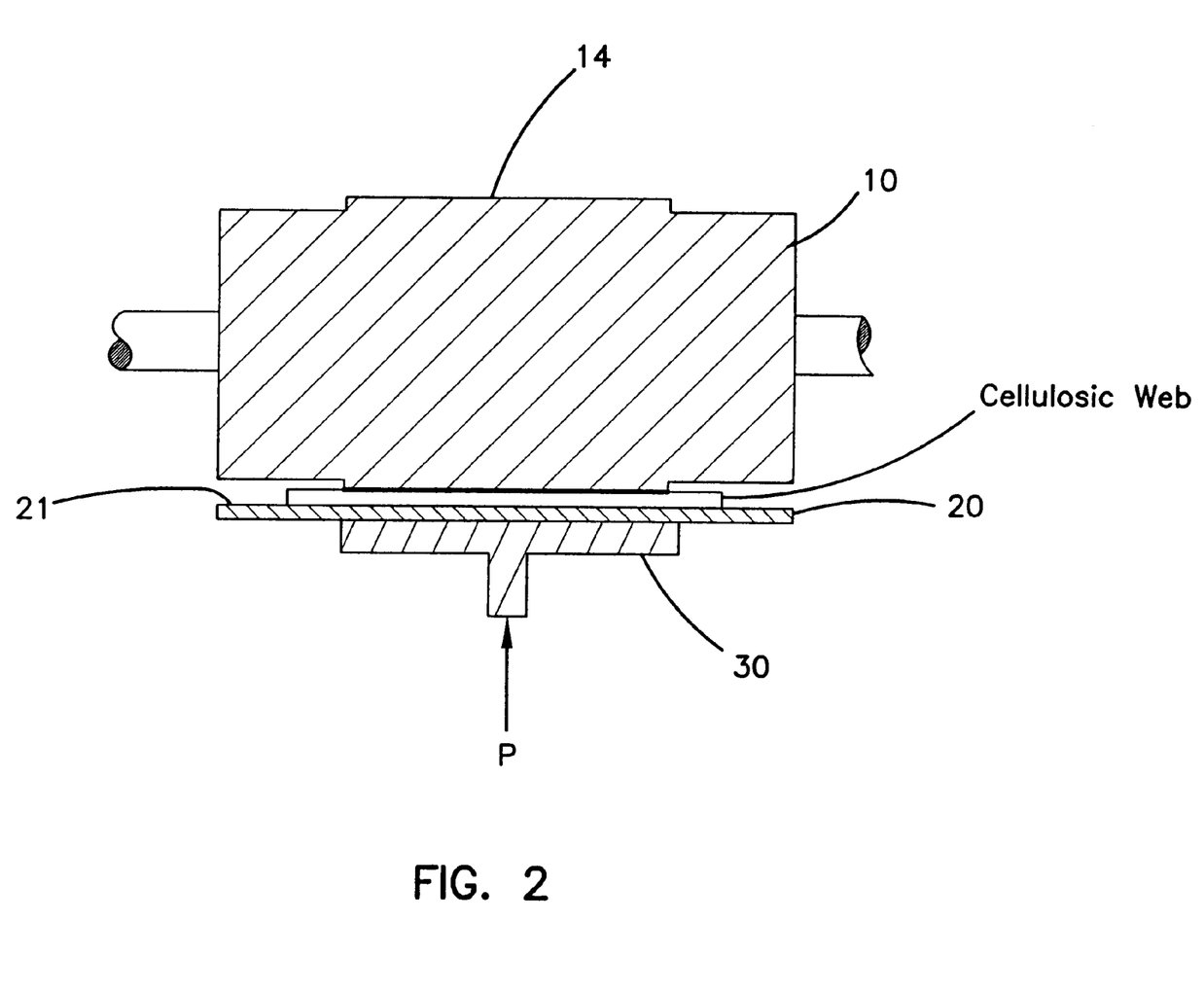
FIG. 2 is a fragmentary side view, partially in section, of the extended nip embosser of the present invention.

Referring now to FIGS. 1–2, an extended nip embosser, generally shown as 100, is configured for embossing a cellulosic web of material. The extended nip embosser 100 has a rotatable embossing roll 10 that rotates about a central axis 12 in the direction shown. The roll's outer surface 14 has a male embossing pattern in a relief pattern typically about 0.5 to 2 mm above the unrelieved roll surface. Generally, the embossing surface should possess sufficient hardness so as not to deform under high pressure or heat. The roll 10 is made of steel or other sufficiently strong material. Examples of roll material include but are not limited to steel, aluminum, magnesium, brass, or hard urethane. The embossing surface can be hardened or constructed of different material.

The male embossing elements are designed according to the desired web embossing pattern. In one embodiment, a "spot" embossing pattern is used. Spot embossing produces a discrete and separate embossing pattern on the web, typically with discrete decorative elements.

The length and width of the male embossing elements are preferably equal to or greater than the distance between surrounding adjacent male elements. The length and width of the male embossing elements typically range from about 5 mm to 25 mm, preferably 12 mm to 20 mm. The density of the elements (the number of elements per square centimeter) can be increased by decreasing the space between the elements. The density of the elements typically ranges from about 1 to 5 elements per square centimeter.

In an alternative embodiment, the embossing elements are heated using traditional methods such as by circulating hot oil or water inside the embossing roll. Heated embossing elements affect the embossing pattern of the web. Generally, the heated elements reduce the web's resiliency thereby creating a more rigid and defined pattern. The extent of heat is dictated by the desired embossing pattern.

Figure 3:
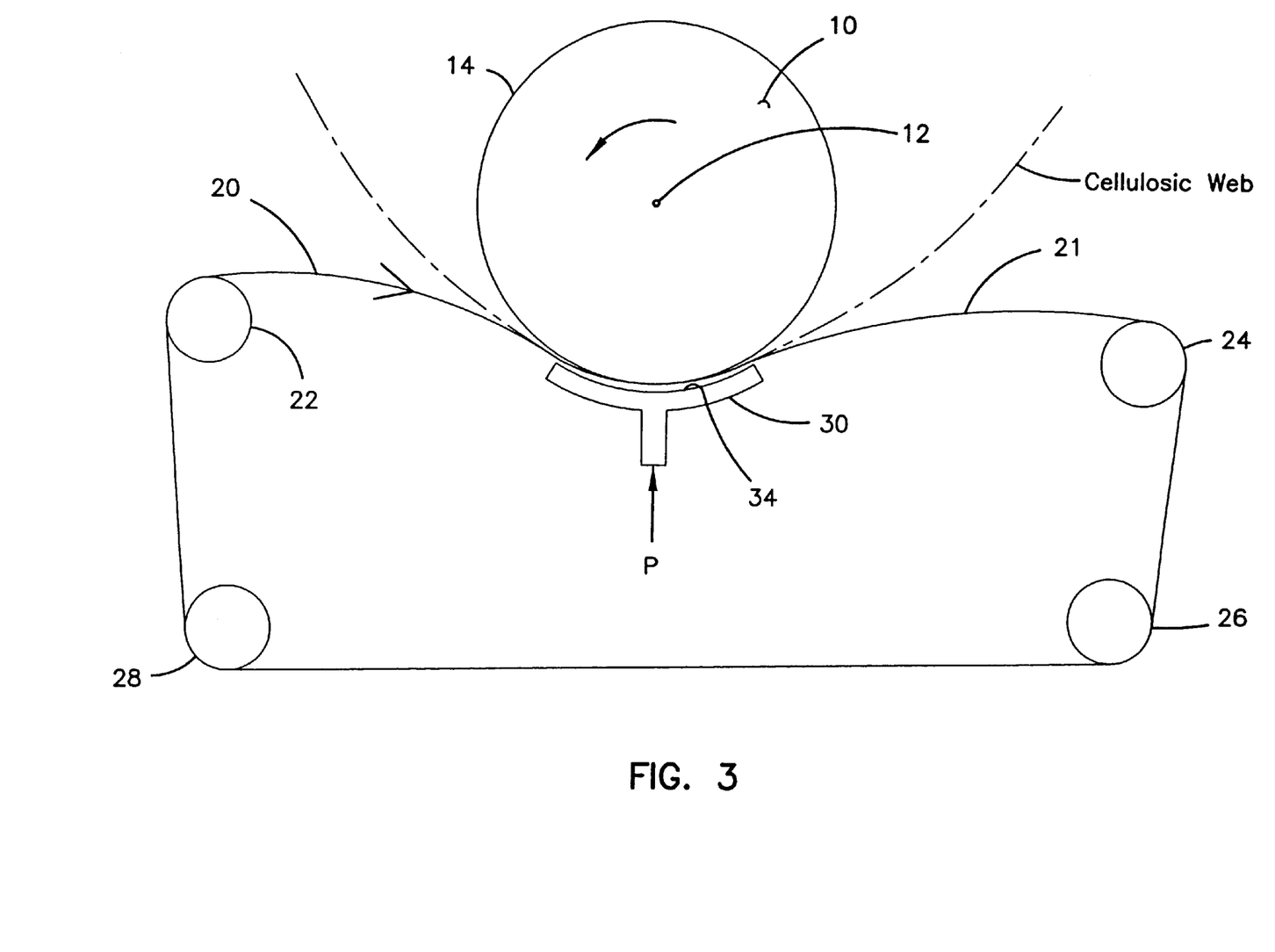
FIG. 3 is a schematic front view of an alternative embodiment of the present invention showing a belt supported by idler rollers.

A flexible continuous belt 20 wraps around a portion of the roll 10 and moves in the direction shown. Preferably, the belt 20 is supported by a belt-support roll 19 as described in U.S. Pat. No. 5,423,949 which is herein incorporated by reference. The preferred embodiment is a "closed" system as is known in the art. FIG. 3 shows an alternative embodiment, where the belt 20 is supported about a plurality of idler rollers 22, 24, 26, and 28. FIG. 3 represents an "open" system. The rollers are adjustable with respect to each other.

Figure 4:
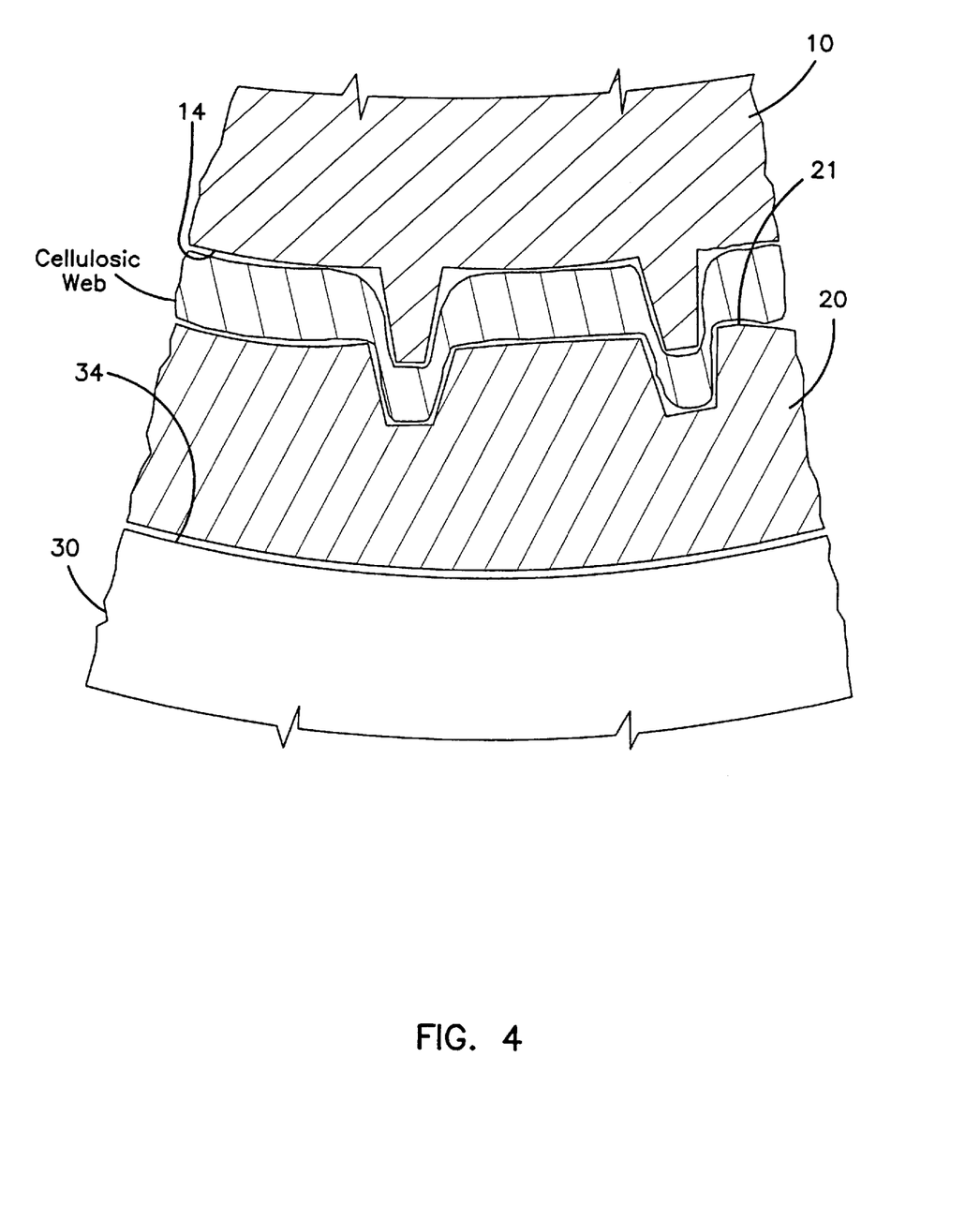
FIG. 4 is an enlarged fragmentary side view of the extended nip embosser of the present invention showing the embossing zone.

Referring now to FIG. 4, the belt 20 has a surface 21. The surface 21 has a female embossing pattern containing female elements which are recessed from the belt surface 21. The female elements are sized to intermesh with the male elements of the roll 10. Additionally, the female elements are positioned to accommodate the intermeshing male elements. Conventional methods are used to create the female elements within surface 21. For example, a laser can be used to burn the pattern into the belt.

The belt 20 is made of flexible material. The material should be flexible enough to conform to the roll 10 at relatively high speeds yet rigid enough to hold the form of the embossing pattern. Examples of belt material include but are not limited to rubber, polyurethane, nylon, polyesters, and polytetra fluoroethylene.

Alternative methods of embossing may be used, involving different combinations of embossed and flat surfaces on the roll 10 and belt 20. For example, the belt surface 21 can be flat and continuous. The belt 20 is made of material softer than the roll 10 such that the male embossing elements temporarily press into the belt surface 21 thereby embossing the web. The length of belt 20 and circumference of roll 10 are unequal such that the same area of belt 20 is not continually embossed by the male elements of roll 10. Alternatively, the belt 20 has male elements and the roll 10 has female elements or is flat.

Referring now to FIG. 2, the general relationship is shown between the components of one embodiment of the present invention. Generally, the width of the roll 10 and belt 20 are sized to accommodate the width of the cellulosic web. The width of belt 20 varies depending on the type of system. For example, in a closed system, the belt 20 is generally substantially wider than the cellulosic web. The widths are varied to accommodate different embossing patterns.

The dimensions for the roll and belt provided herein are only for purposes of example and do not limit the scope of the claimed invention.

A press shoe 30 is disposed adjacent the belt 20 opposite the roll 10. The press shoe 30 has a concave surface 34 substantially matching the curvature of the roll surface 14. The press shoe 30 is generally centered along the parallel path of the belt and located such that the concave surface 34 substantially matches with the roll surface 14.

In operation, a force P presses the press shoe 30 towards the belt 20. This force is the nip load. The nip load causes the belt 20 to partially wrap around an arc of the roll 10 thereby creating an extended nip. This extended nip defines the embossing zone. A web of cellulosic material is passed through the extended nip and an embossing pattern is imparted on the web by the embossing pattern of the roll 10 and belt 20. The web is then removed from the extended nip.

The web is embossed primarily by the pressure exerted on the web by the intermeshing of the embossing elements. This pressure is dictated by the nip load. The embossing process does not rely on temperature to impart an embossing pattern. In addition, the web is not heated or otherwise softened prior to entering the embossing zone. The nip load is applied conventionally. The nip load is about 50 to 400 pounds per linear inch (8757–70053 Newton per meter (N/m)), preferably 150 to 200 pounds per linear inch (26270–35026 N/m).

The cellulosic web entering the embossing zone is substantially free of water and possesses a relatively low moisture content. Since the web is cellulosic, the web has an inherent moisture level. However, the web does not contain any amount of water that can be removed by the pressure of the nip.

The web is within the embossing zone during a certain dwell time which can be calculated from the length of the embossing zone (nip width) and the speed of web travel. The amount of dwell time is critical to the embossing pattern. Longer dwell times generally lead to a more defined embossing pattern and increased pattern retention. The length of the press shoe 30 determines the nip width and thus the dwell time. A longer press shoe 30 will cause the belt to wrap around a larger arc of the rotatable roll 10, thereby increasing the dwell time. Generally, the nip width must be increased for higher web speeds. In addition, a larger nip load leads to a more defined embossing pattern and increased pattern retention. However, unlike conventional roll-to-roll embossing, the nip load of an extended nip embosser has substantially no effect on dwell time. Tables 1 and 2 compare different geometries of a roll-to-roll embosser (Table 1) and an extended nip embosser (Table 2).

As can be seen in Table 2, the dwell time can be increased using the same nip load, thereby improving pattern retention. A nip width of approximately 240 mm is produced by a shoe arc of approximately 60°. This is advantageous over conventional roll-to-roll embossers which are generally limited to a nip width of approximately 50 mm or less.

TABLE 1

Prior Art (Roll-to-Roll Embossing)

| Rubber Roll Diameter | 501.65 mm |
| Steel Roll Diameter | 457.2 mm" |
| Cover Thickness | 22.25 mm" |
| Cover Hardness | 70 Shore "A" |
| Speed | 550 meters per minute |

| Load (N/m) | Nip Width (mm) | Dwell Time (seconds) |
| --- | --- | --- |
| 616.5 | 6.35 | 0.0007 |
| 2614.4 | 12.7 | 0.0014 |
| 6437.3 | 19.1 | 0.0020 |
| 12825.4 | 25.4 | 0.0027 |
| 122814.5 | 31.8 | 0.0034 |
| 37736.5 | 38.1 | 0.0042 |
| 59219.0 | 44.5 | 0.0049 |
| 89186.2 | 50.8 | 0.0055 |

TABLE 2

Extended Nip Embosser

| Steel Roll Diameter | 457.2 mm" |
| Belt Thickness | 25.4 mm |
| Belt Hardness | 70 Shore "A" |
| Speed | 550 meters per minute |

| Shoe Arc (degrees) | Load (N/m) | Nip Width (mm) | Dwell Time (seconds) |
| --- | --- | --- | --- |
| 10 | 17513.1 | 39.9 | 0.0044 |
| 20 | 17513.1 | 79.8 | 0.0087 |
| 30 | 17513.1 | 119.6 | 0.0131 |
| 40 | 17513.1 | 159.5 | 0.0174 |
| 50 | 17513.1 | 199.4 | 0.0218 |
| 60 | 17513.1 | 239.3 | 0.0262 |

Figure 5:
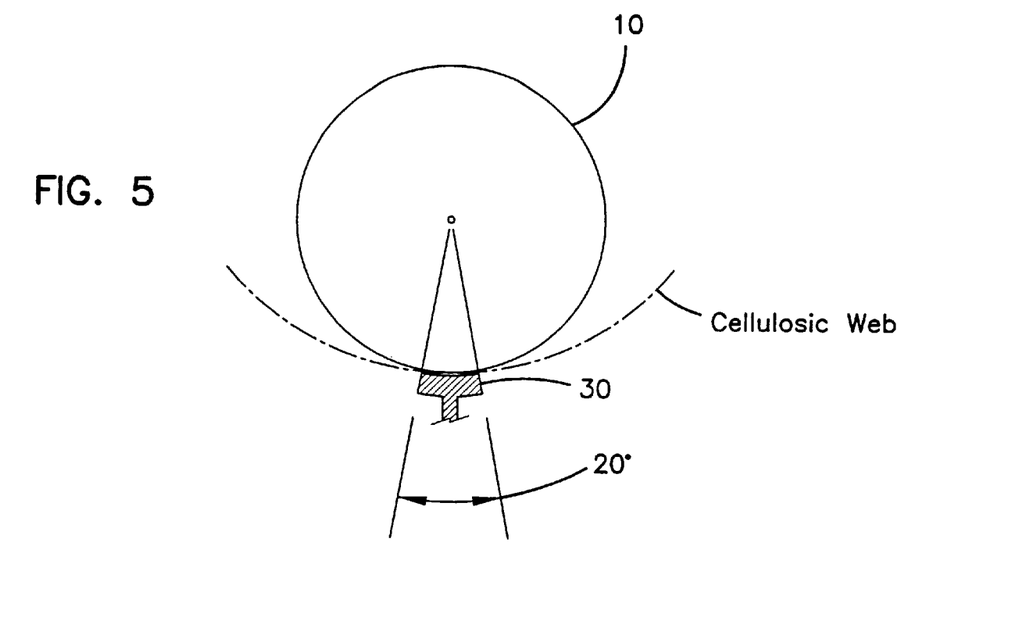
FIG. 5 is a fragmentary front view, partially in section, of an alternative embodiment of the present invention showing a dwell time defined by a roll arc angle of 20 degrees.
Figure 6:
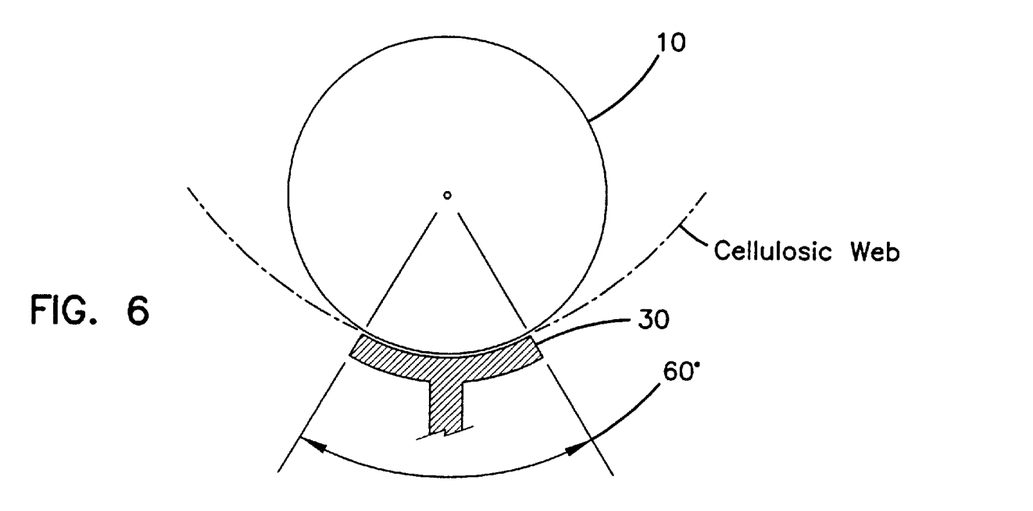
FIG. 6 is a fragmentary front view, partially in section of an alternative embodiment of the present invention showing a dwell time defined by a roll arc angle of 60 degrees.

FIGS. 5 and 6 show alternate embodiments of the present invention. FIG. 5 shows a dwell time defined by an angle of arc of 20 degrees. FIG. 6 shows dwell time defined by an angle of arc of 60 degrees.

Referring now to FIG. 4, the distance from the belt surface 21 to the corresponding roll surface 14 is the nip height. The nip height is independently controlled by the amount of force P applied to the pressure shoe 30. The nip height is dictated by the desired embossing pattern. This has the advantage of greater flexibility. The nip height is efficiently changed to accommodate different web materials or different embossing patterns. The nip height is also dependent on the resiliency and resulting compression of the belt 20, roll 10, and cellulosic web.

The nip height also determine the embossing level. The embossing level is the distance the male element penetrates the corresponding female void. The larger the penetration the deeper the embossing pattern. The embossing level is from about 0.1 to about 1 millimeter.

Lubrication can be provided between the press shoe's concave surface 34 and the belt 20. Lubrication ensures low friction between the running belt and concave surface 34 when pressure is applied by the concave surface 34, belt 20 and roll 10. Conventional lubrications are used such as hydraulic fluid.

Preferably, the lubrication is supplied within a "closed" system as is described in U.S. Pat. No. 5,423,949 which is incorporated by reference. A closed system is one where the lubrication is fully contained within a housing and is protected from ambient contaminants. Such a closed lubrication system is advantageous because it protects the lubricant from outside contaminants, common in a manufacturing setting. This increases lubrication efficiency and life. Also, lubrication is not lost through random leakage or spray, and lubrication does not contaminate the web on the opposite side of the belt.

In operation of the extended nip embosser, the nip load and nip width are selected according to the desired embossing pattern. The variables are dictated by the web material and the selected web speed. Preferred web speeds range from about 150 to 1200 meters per minute, preferably from about 450 to 750 meters per minute. For example, a web with a high resiliency demands a higher nip load to produce a retained pattern. To accomplish this, the present invention is easily altered to increase the nip width, and increase the nip load. Embossing element height also effects the embossing pattern and can be modified as needed by interchanging rolls or belts.

The method of embossing according to the present invention allows for greater operational control. The operator may select a constant web speed and nip width and then proceed to adjust the nip load in order to optimize the embossing pattern. Alternatively, the nip load and nip width can be held constant while the web speed is varied. The ability to independently control the embossing variables allows for greater flexibility and production efficiency.

We have found that the use of an extended nip in embossing cellulosic sheets is a substantial improvement in the quality of the embossed pattern in the sheet. We have found that the improvement results in an improved embossing pattern even in sheets with substantial resiliency.

Although the description of the preferred embodiment and method have been quite specific, modifications of the process of the invention could be made without deviating from the spirit of the present invention. Accordingly, the scope of the present invention is dictated by the appended claims, rather than by the description of the preferred embodiment and method.

I claim:

1. A method for introducing an embossed pattern into a cellulosic web material, comprising the steps of:

passing the web material into a nip path formed between a rotatable roll and a continuous rotatable flexible belt, said rotatable roll having a cylindrical outer surface, said belt having a belt surface facing the cylindrical outer surface of said rotatable roll;

pressing a press shoe towards said rotatable roll with said flexible belt therebetween, said press shoe disposed on the side of the belt opposite said rotatable roll surface, said press shoe having a concave surface substantially matching the radius of said cylindrical outer surface of said rotatable roll, such that said belt conforms to the cylindrical outer surface of said rotatable roll, pressing said web material into surface conforming contact such that an embossing pattern is introduced into the web material, said embossing pattern defined by embossing elements wherein the number of embossing elements per square centimeter is about 1 to 5 elements, said nip path having a dwell time which is sufficient to impart a retained embossing pattern on said cellulosic web and which is defined by the angle of arc through which the rotatable roll contacts the belt, said angle of roll arc being between 10 degrees and 60 degrees;

driving the surface of the rotatable roll and the surface of the flexible belt at a speed substantially equal to the speed of the web material travel; and removing the embossed cellulosic web material from said nip path.

2. The method of claim 1, wherein the press shoe is pressed towards the flexible belt and rotatable roll at a force of about 8760 N/m to 70,005 N/m.

3. The method of claim 1, wherein the press shoe is pressed towards the flexible belt and rotatable roll at a force of between 17,500 N/m and 35,000 N/m wherein said angle of roll arc is between 20 and 40 degrees.

4. The method of claim 1, further comprising supplying a lubricant to said concave surface of said press shoe to provide a lubricating layer between said belt and said press shoe.

5. The method of claim 1, wherein the cellulosic web material is substantially free of water removable by the shoe pressure.

6. The method of claim 1, further comprising the steps of driving the web at a constant speed and altering the pressure on the press shoe.

7. The method of claim 1, further comprising the steps of pressing the press shoe at a constant pressure, and altering the nip width.

8. The method of claim 1, wherein said roll outer surface has an embossing pattern, said roll embossing pattern is defined by lands and said lands extend about 0.3 to 4 millimeters above the roll surface.

9. The method of claim 1, wherein said roll outer surface has an embossing pattern, said roll embossing pattern is defined by lands and said lands extend about 0.3 to 4 millimeters above the roll surface, and wherein said flexible belt surface comprises an embossing pattern, said belt embossing pattern defined by recesses, said recesses extend about 0.3 to 4 millimeters below the belt surface.

10. The method of claim 1, wherein said roll outer surface has an embossing pattern, said roll embossing pattern is defined by recesses and said recesses extend about 0.3 to 4 millimeters below the roll surface, and wherein said flexible belt surface comprises an embossing pattern, said belt embossing pattern defined by lands, said lands extend about 0.3 to 4 millimeters above the belt surface.

11. The method of claim 1, wherein said flexible belt comprises an embossing pattern, said belt embossing pattern defined by lands, said lands extend about 0.3 to 4 millimeters above the belt surface.

* * * * *